(12) United States Patent
Ledbetter et al.

(10) Patent No.: US 8,294,304 B1
(45) Date of Patent: Oct. 23, 2012

(54) CHARGE DEVICE WITH SOLENOID ON FRAME

(76) Inventors: Finley Lee Ledbetter, Argyle, TX (US);
Ashley Sue Ledbetter, Argyle, TX (US)

( * ) Notice: Subject to any disclaimer, the term of this patent is extended or adjusted under 35 U.S.C. 154(b) by 352 days.

(21) Appl. No.: 12/775,297

(22) Filed: May 6, 2010

Related U.S. Application Data (63) Continuation-in-part of application No. 12/361,223, filed on Jan. 28, 2009, now Pat. No. 7,804,201, and a continuation-in-part of application No. 12/500,523, filed on Jul. 9, 2009, now Pat. No. 8,151,452.

(60) Provisional application No. 61/084,897, filed on Jul. 30, 2008.

(51) Int. Cl.
*H01H 83/00* (2006.01)
(52) U.S. Cl. .................................................. 307/125
(58) Field of Classification Search .................. 307/125
See application file for complete search history.

(56) References Cited

U.S. PATENT DOCUMENTS

| | | | |
|---|---|---|---|
| 5,477,017 A | 12/1995 | Swindler et al. |
| 6,777,627 B1 | 8/2004 | Stevenson |
| 6,897,388 B2 | 5/2005 | Greer |
| 6,951,990 B1 | 10/2005 | Miller |
| 7,019,230 B1 | 3/2006 | Vaill et al. |

*Primary Examiner* — Robert L. DeBeradinis
(74) *Attorney, Agent, or Firm* — Gardere Wynne Sewell LLP (57) ABSTRACT

A charge, close, trip device with a solenoid on a frame or a motor. The frame can include supports, beams, and handles. The motor can be mounted on a mount with a bracket that can be attached to the frame. A solenoid can be mounted on a bracket that can be mounted to the frame. The solenoid can have a plunger for engaging buttons on equipment. A gear assembly can be in a gear box attached to the motor mount bracket. The gear assembly can have a collar that can connect to a shaft. The shaft can include a key in a shaft key way. The gear box can include a gear box key way and a shaft housing for engaging the shaft. The motor can be connected to the gear box. Magnet housings can be connected to the frame with extendable magnets disposed inside.

20 Claims, 12 Drawing Sheets

CHARGE DEVICE WITH SOLENOID ON FRAME

CROSS REFERENCE TO RELATED APPLICATIONS

The present application is a continuation-in-part co-pending U.S. patent application Ser. No. 12/361,223 filed Jan. 28, 2009, entitled "PORTABLE REMOTE SWITCH OPERATOR SYSTEM" and is a continuation-in-part of co-pending U.S. patent application Ser. No. 12/500,523 filed Jul. 9, 2009, entitled "PORTABLE ELECTRICAL EQUIPMENT RACKING TOOL", which claims priority and the benefit of U.S. Provisional Patent Application Ser. No. 61/084,897 filed on Jul. 30, 2008, entitled "CIRCUIT BREAKER REPLACEMENT TOOL". These references are incorporated herein in their entirety.

FIELD

The present embodiments generally relate to a motorized charge, close, and trip device with at least one solenoid mounted on a frame or on a motor that can be remotely controlled for actuation of the device from a safe distance using a portable power supply.

BACKGROUND

A need exists for a remotely operable battery powered portable motorized charge, close, trip device that can magnetically secure to metal around an insulated case circuit breaker.

A further need exists for a charge, close, trip device that is usable with switch gear housings for circuit breakers, wherein the remotely operable device does not need to be attached to a wall outlet.

The present embodiments meet these needs.

BRIEF DESCRIPTION OF THE DRAWINGS

The detailed description will be better understood in conjunction with the accompanying drawings as follows.

The present embodiments are detailed below with reference to the listed Figures.

DETAILED DESCRIPTION OF THE EMBODIMENTS

Before explaining the present apparatus in detail, it is to be understood that the apparatus is not limited to the particular embodiments and that it can be practiced or carried out in various ways.

The present embodiments relate to a framed robot for charging, closing, or tripping electrical equipment within a hazardous arc flash zone.

This device enables an operator to be a safe distance from gear in an electrical room so that the operator is not harmed if arcing or shocks occur.

The device can include simple components and can require no special training to operate.

The device can be portable and lightweight, for example the device can weigh less than fifty pounds.

The device can charge, close, or trip a circuit breaker without drilling holes in the electrical equipment.

The device can be used to charge, close, or trip any variety of DS circuit breakers thereby allowing a user to be able to purchase one device for use with all of that user's circuit breakers. For example, a refinery might have any where from 3 to 50 different DS style circuit breakers. That refinery can purchase and use a single device to charge, close, or trip every DS style circuit breaker at the refinery. There is no longer a need to provide individual charge, close, tripping devices that are permanently affixed over each circuit breaker.

The device can reduce the cost of maintenance of circuit breakers.

Users of the device can include but are not limited to operators in chemical plants, hospitals, hotel electrical rooms, and other electrical areas with switch gear and circuit breakers.

The device can effectively remove the operator from immediate danger from arc flashing. The operator can be completely out of the arc flash zone.

Operators of the device can be typically from about ten feet to about twenty five feet away from the circuit breaker or electrical equipment being charged, closed, or tripped, thereby preventing electrical shock of the operator.

The device can reduce a facility's need to buy as much high level protective equipment, allowing the facility to procure lighter-weight personal protective equipment that is not as hot, heavy, or as likely to cause heart attacks in wearers.

The use of the device can lower costs to a facility by a service company or owner of the facility, because the facility can avoid purchasing as many expensive high level shock arc flash safety suits.

Use of the device can reduce liability to a user because of the reduced exposure time in the arc flash suits due to the quickness of the mechanized charge, close, or trip.

The present embodiments relate to a charge, close, trip device with a solenoid on a frame that can be made from aluminum channel, lightweight reinforced plastic, or reinforced composites.

The frame can include supports. For example, the frame can include a first side support which can have a first side support front side. The side supports can have lengths from about six inches to about forty eight inches. The supports and beams can each have a width from about two inches to about five inches. The thickness of the sides support beams can be from about two inches to about four inches.

The frame can have a second side support which can have a second side support front side.

The frame can have a first beam which can connect supports, such as the first side support with the second side support. The beams and the side supports can be made from the same channelized aluminum material.

The first beam can be disposed between the first side support and the second side support. The first beam can be fastened onto the first side support front side and the second side support front side, or fastened into the channels of each of the side supports.

The device can include a handle that can be connected to the frame. The handle can be insulated.

The handle can be connected to the first beam, the first side support, the second side support, or combinations thereof.

One or more embodiments can include a second handle that can be engaged with the second side support. If two handles are used, one of the handles can be mounted to each side support.

The device can include a motor mount that can be attached to the frame. The motor mount can be made from the same aluminum channel as the side supports and the optional beam.

The motor mount bracket of the device can be plate steel, and can have a length and height that is from about 20 percent to about 50 percent of the overall frame length and height. The plate of the motor mount can have a thickness of from about ¼ inch to about ½ inch and can be made from steel or a polymer reinforced plate. The motor mount can be perforated to create an even more lightweight robot.

For example, one end of the motor can be attached to the first side support and another end of the motor can be attached to the second side support.

The device can include at least one solenoid mount bracket or a plurality of solenoid mount brackets. Each solenoid mount bracket can be mounted to the frame.

The device can include at least one solenoid or a plurality of solenoids, such as two solenoids. Each solenoid can have a plunger that can engage the electrical device.

In one or more embodiments of the charge, close, trip device with the solenoid on the frame, the frame can have a first side support with a first side support front side and a second side support with a with a second side support front side.

The motor can be a DC direct drive motor. The motor can be a 12 volt motor. The motor can be connected to the motor mount or to a gear box secured to the frame.

At least one solenoid, for example two solenoids, can be secured to the frame, to the motor mount, to the motor, or to combinations of these components.

Each solenoid can have a solenoid plunger for engaging an actuating button on electrical equipment. The plunger can be from about one inch to about five inches long and can be a straight rod, a bent rod, or a rod with multiple bends in it for engaging the electrical equipment and moving around obstructions.

The device can include a means for communicating and a means for providing power between each solenoid and a remote switch operator. The two different means can be in a single cable that can deliver power and signals simultaneously.

A gear box can be attached to the frame. It can be plastic or metal. It can be about 4×4 inches. The gear box can be integral with the motor.

A gear assembly can be in the gear box.

The gear assembly can have a gear box collar with a diameter larger than a connected rotatable shaft with a smaller diameter. The gear box collar can be at least 20% larger in diameter than the rotatable shaft.

The rotatable shaft can have an engagement key in a shaft key way. The engagement key can be a small rod of metal that can be removable. In embodiments, the engagement key can be a square rod that can be two inches long.

The gear box can have a gear box key way and a shaft housing for engaging the rotatable shaft. The diameter of the shaft housing can be slightly larger than the outer diameter of the rotatable shaft.

A motor communication means can connect the motor with a control box and can be a cable. The control box can be mounted to the frame or to the motor mount bracket.

An interface plug can be disposed in the control box for receiving power and signals from a remote switch operator which can include its own remote controller.

The device can include at least one at least partially shielded magnet housing that can be connected to one of the side supports. At least one extendable magnet, such as a two inch diameter magnet, can be each at least partially shielded magnet housing secured to a magnet handle which can be non-magnetic.

A first beam can connect the first side support with the second side support and various components can be attached into the first beam, which can have channels identical to the side supports.

In embodiments, the first beam can be fastened onto at least one channel on the first side support front side and the second side support front side.

One or more handles can be connected to the frame for ease of operator use.

The handles can be connected to the first beam, the first side support, the second side support, or combinations thereof.

A first stabilizing foot and a second stabilizing foot can enable the device to stand independently on a shelf or floor for easy storage without taking up excessive space.

The device can include at least one solenoid mount bracket mounted between the at least one solenoid and the frame which can be a bent plate.

The extendable magnets can be rotatable in at least two directions within the at least partially shielded magnet housing a magnet handle. The magnets can extend up to 15% of their thickness outside of the magnet housing in order to connect to the metal surfaces around the electrical equipment.

A coupling can be disposed on the gear box collar that can engage the electrical equipment.

One or more embodiments can include a control box mount positioned between the control box and the frame for reinforcing the frame.

The means for communicating and means for providing power can be disposed within a single solenoid power communication cable for simultaneous power and communication transmission to the solenoid. A retractile cord can be used in embodiments.

The device can communicate from a remote controller that can be wireless to the RSO that can be wired to the charge, close, trip device. The device can be controlled from a distance of at least 150 feet using multiple frequencies and a wireless connection.

The device can engage a remote switch operator (RSO) that can have a housing such as one made from an explosion resistant reinforced plastic. The housing can have closeable lid and a body that can have a volume of about two square feet.

The RSO can have a face plate with at least two plugs in the face plate for providing current and signals from the housing to the charge, close, trip device. A DC power plug can be in the face plate for receiving power into the housing of the RSO, such as from a secondary source.

A circuit board can be beneath the face plate in the housing. The circuit board can communicate between one or more relays.

The relays can engage at least one battery, and possibly two batteries connected in series. The batteries can be mounted within the housing.

The batteries can be connected to the DC power plug for receiving incoming DC power and for charging the batteries.

The RSO can have a receiver/transmitter in communication with the circuit board and a remote controller which can be removably connected under the face plate for remotely actuating the relays a distance from the remote switch operator. The remote controller can be wireless or can be in a wired configuration with a retractile cord.

The RSO can have on the face plate a plurality of buttons which can be operated by a remote controller with the same functionality.

The buttons on the face plate of the RSO can include a trip momentary push button in the face plate engaging the circuit board; a close momentary push button engaging the circuit board; a charge close momentary push button engaging the circuit board; and a jog momentary push button engaging the circuit board.

The gear box can have a gear box key way and a shaft housing for engaging the rotatable shaft.

An on/off switch in the face plate can connect or disconnect the at least one battery with the at least one relay.

A circuit breaker in the face plate can connect between the relays and the on/off switch. A timer circuit board can be in communication between the relays and the circuit board. A first timer potentiometer can be in the face plate and connected to the timer circuit board. A second timer potentiometer in the face plate can be connected to the timer circuit board. A stroke potentiometer in the face plate can be connected to the timer circuit board.

The device can have a charger power supply in the housing beneath the face plate for receiving AC current from an outside source, and AC plug in the face plate for receiving AC current from the outside source and transferring the AC current to the charger power supply.

The RSO can include a remote controller that can have an on/off button, a jog button, a trip button, a close button, and a charge/close button which can correspond to the buttons on the face plate of the RSO.

Additionally, the RSO can have an automatic shut off switch on the face plate connected to the circuit board for disabling a remote device when the remote device exceeds preset amperage.

The RSO can have a microprocessor and a flash memory with computer instructions for comparing signals from the potentiometers to a predetermined threshold.

The device, which can be remotely controlled and motorized, can be operated upon electrical equipment. The electrical equipment can include low voltage circuit breakers using up to 1000 volts, medium voltage circuit breakers using from 1000 volts to 20000 volts, switch gears, or manually operated circuit breakers.

In one or more embodiments a solenoid can be disposed on the motor.

In one or more embodiments, a removable torque limiting clutch can be secured to the rotatable shaft.

The device can include a rotating coupling for engaging the removable torque limiting clutch opposite the rotatable shaft.

Figure 1:
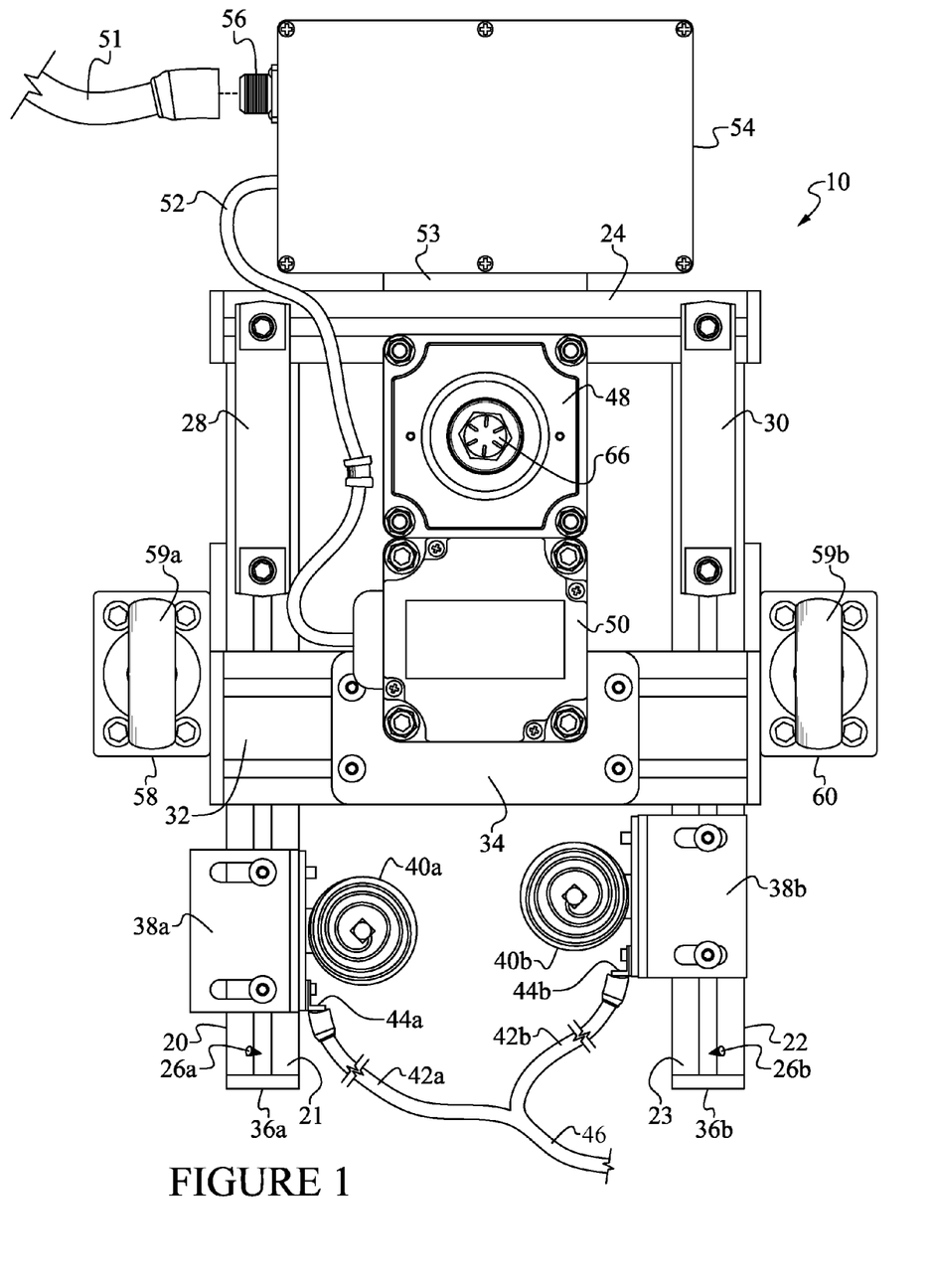
FIG. 1 depicts a double handle, double solenoid embodiment of the device including the motor.

Turning now to the figures, FIG. 1 shows a front view a charge, close, trip device 10. The device has a frame including a first side support 20 having a first side support front side 21, and a second side support 22 with a second side support front side 23.

A first beam 24 can connect the first side support 20 with the second side support 22.

A first handle 28 can be connected to the first side support 20, and a second handle 30 can be connected to the second side support 22.

A motor mount 32 can be attached at one end to the first side support 20 and at another end to the second side support 22.

A motor mount bracket 34 can be secured to the motor mount 32.

A first solenoid mount bracket 38a and a second solenoid mount bracket 38b can be mounted to the first side support 20 and second side support 22 respectively.

A first solenoid 40a can be secured to the first solenoid mount bracket 38a. A second solenoid 40b can be secured to the second solenoid mount bracket 38b.

The means for providing power to the solenoid can be a first solenoid power communication cable 42a which simultaneously provides power and communication signals, and can be connected to a terminal 44a which can communicate with the first solenoid 40a. A second solenoid power communication cable 42b can be connected to a second terminal 44b which can communicate power and signals simultaneously with the second solenoid 40b.

Figure 8:
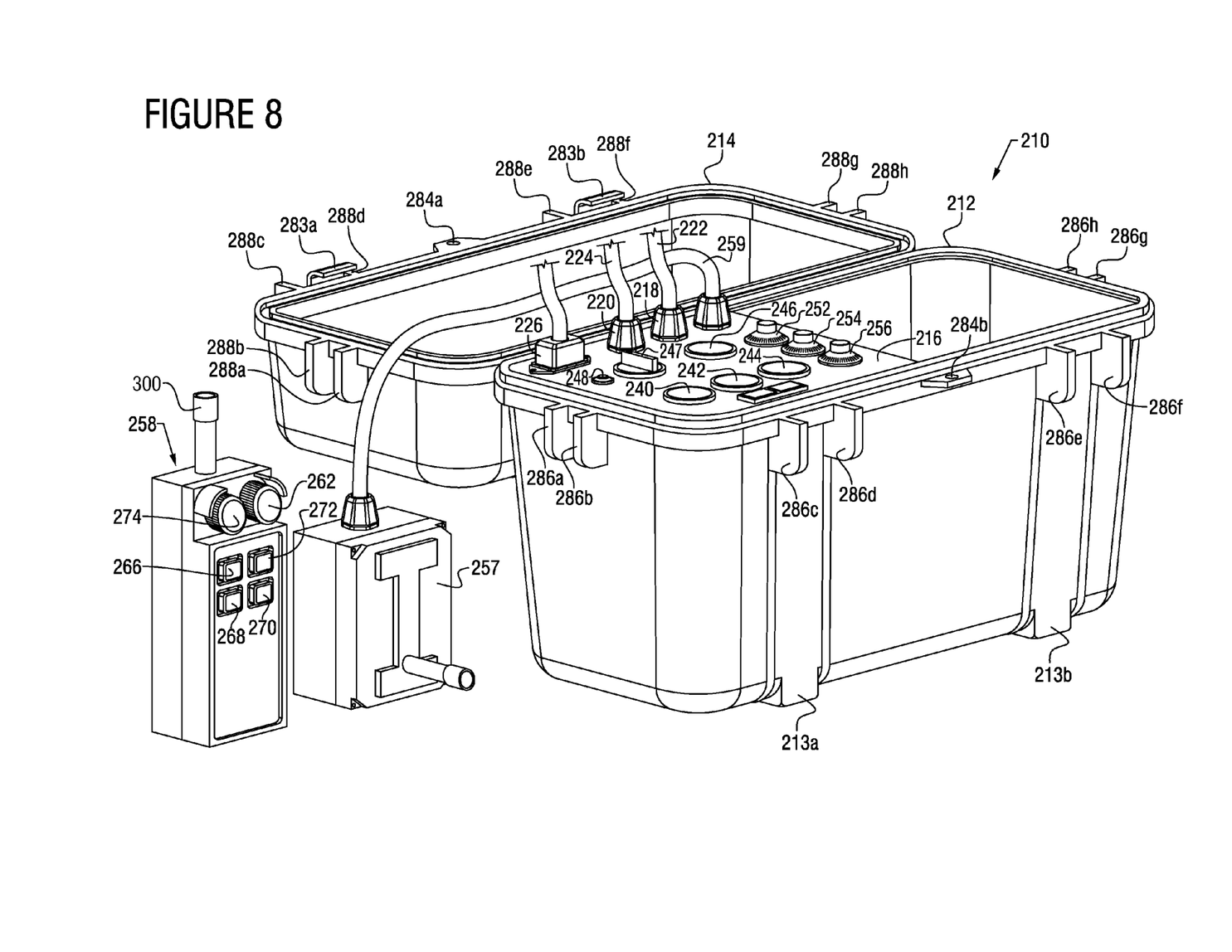
FIG. 8 depicts a top perspective view of a remote switch operator with remote controller.

The first solenoid power communication cable 42a and the second solenoid power communication cable 42b can engage a power and signal line 46 from the remote switch operator 210 (which is shown in more detail in FIG. 8). The remote switch operator, which is also termed "RSO" herein, can provide electrical power and communication signals to a motor 50 and the solenoids.

A gear box 48 can be attached to the motor mount bracket 34 or the motor 50.

A motor communication cable 52 can connect between the motor 50 and a control box 54 for providing electrical power and communication signals between the motor and the control box.

An interface plug 56 can be disposed on the control box 54 for providing electrical power and communication signals to the control box 54.

The device can have an interface cable 51 for engaging the interface plug 56 for providing the power and signals from the RSO.

The control box 54 can be disposed on a control box mount 53.

An at least partially shielded first magnet housing 58 can be connected to the first side support 20.

An at least partially shielded second magnet housing 60 can be connected to the second side support 22. The at least partially shielded magnet housings can be made at least partially from plastic, stainless steel, or another material that does not become magnetic when adjacent a magnet.

The first side support 20 can have a first stabilizing foot 36a. The second side support 22 can have a second stabilizing foot 36b.

The first side support 20 can have a plurality of channels formed in the support for quick engagement and release of components. The channel 26a can be seen formed in the first side support front side 21 and the channel 26b can be seen formed in the second side support front side 23.

In embodiments, one channel can be longitudinally formed in each side of each side support.

In embodiments, one channel only can be formed in two opposite sides of each side support.

Additionally, the magnets, can be extended and rotated using magnet handles. Two magnet handles 59a and 59b are shown in this view, one for each of the magnets.

A gear assembly 66 can be disposed in the gear box 48.

Figure 2:
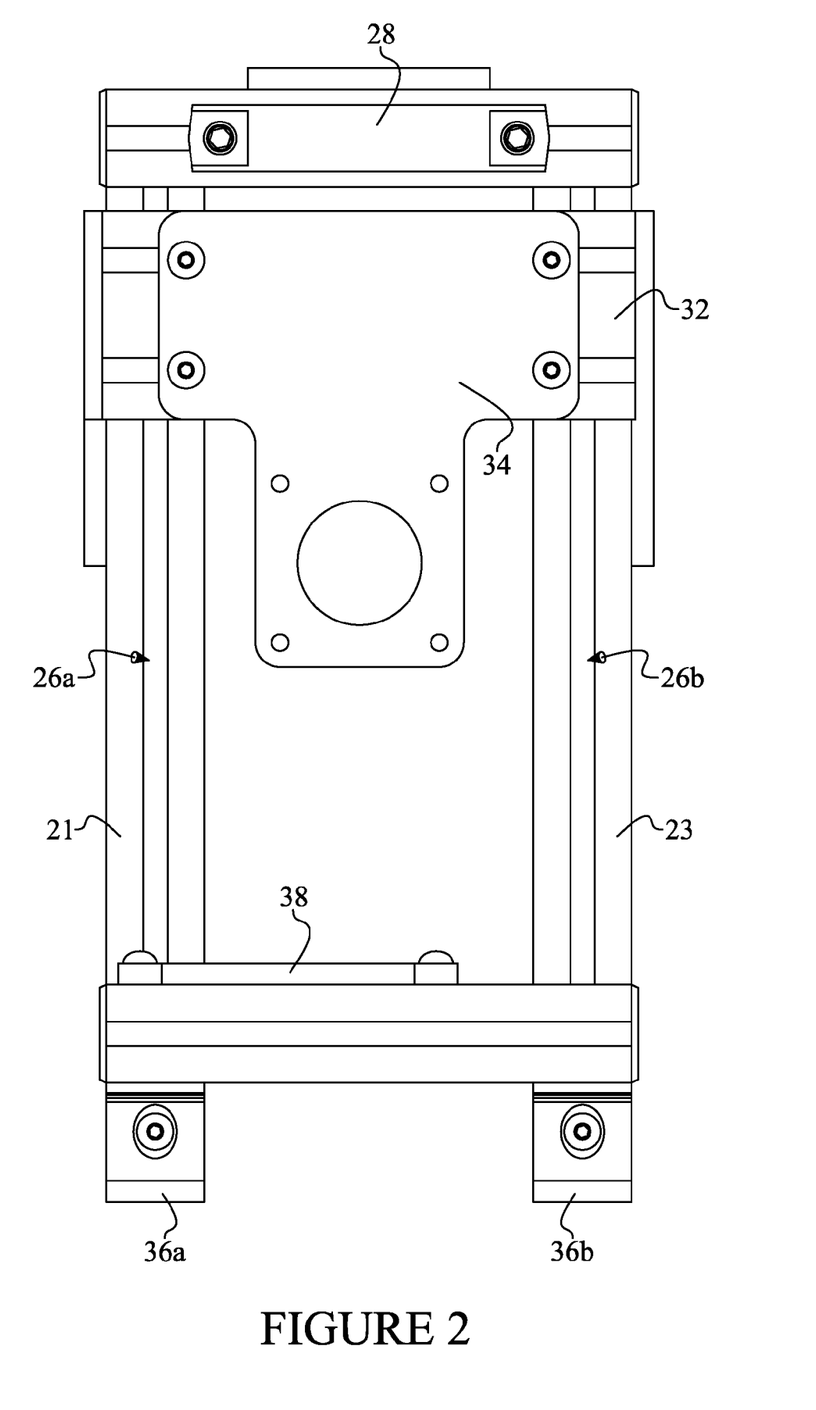
FIG. 2 depicts a single handle embodiment of the device without the motor mounted thereon.

FIG. 2 shows a front view of a single handle embodiment of the device without the motor or gear box mounted thereon.

The embodiment depicted has a single handle 28.

A motor mount bracket 34 is engaged with the motor mount 32. A first solenoid mount bracket 38 is shown.

The first stabilizing foot 36a and the second stabilizing foot 36b are also depicted.

A first channel 26a is shown formed along the entire length of the first side support front side 21. In embodiments, channels may only extend a portion of the length down the side supports.

A second channel 26b is shown formed along the entire length of the second side support front side 23.

Figure 3:
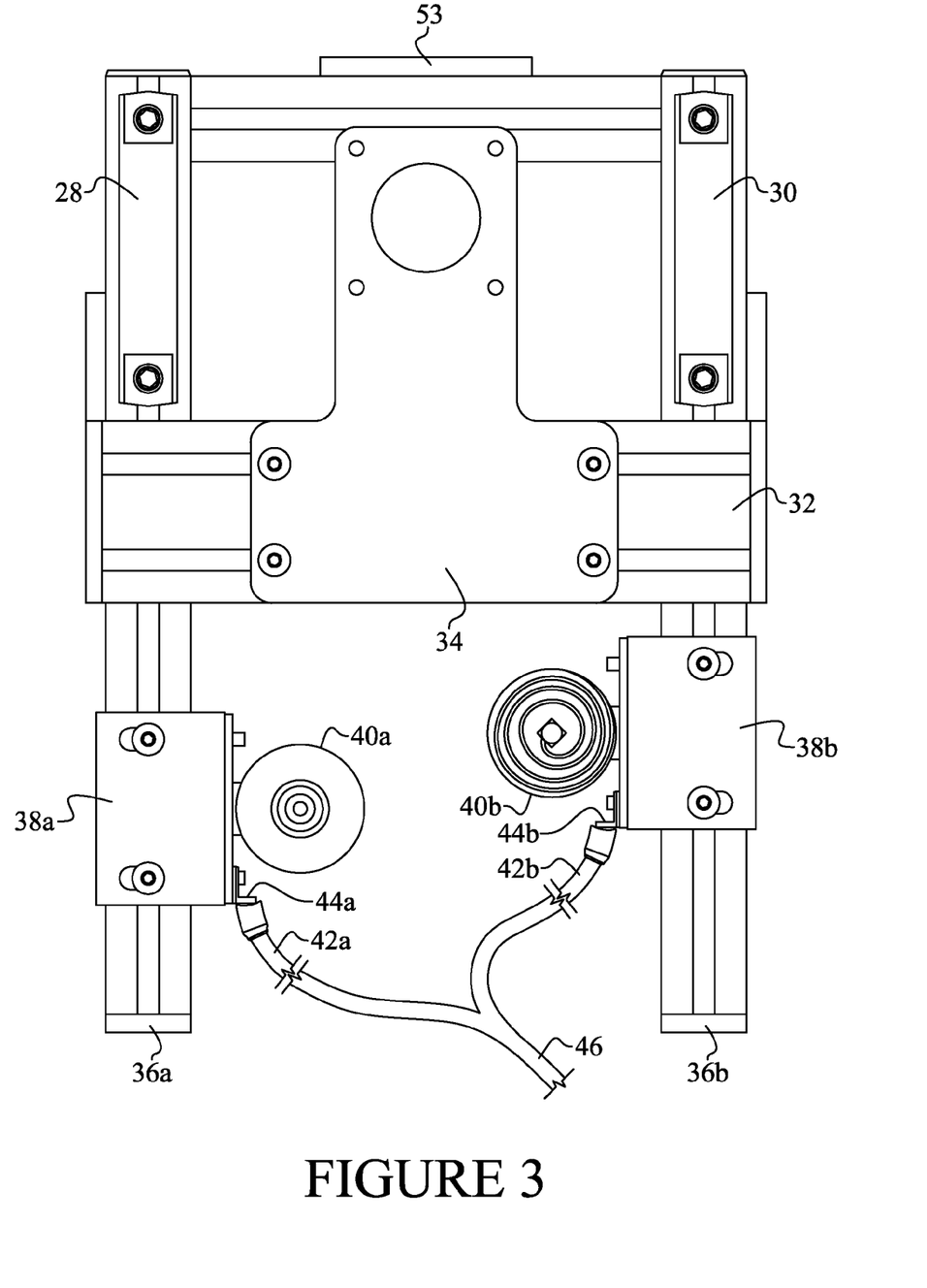
FIG. 3 depicts a double handle, double solenoid embodiment of the device without the motor mounted thereon.

FIG. 3 shows a front view of a double handle embodiment of the device without the motor and gear box mounted thereon.

The embodiment depicted has a first handle 28 and a second handle 30.

The solenoid terminals 44a and 44b each engage a power and signal cord 42a and 42b. The power and signal cords 42a and 42b engage the remote switch operator for providing electrical power and communication signals between the solenoids and the remote switch operator using a power and signal line 46.

The control box mount 53 can be used for supporting a control box (not shown).

The motor mount bracket 34 is depicted connected to the motor mount 32.

Figure 4:
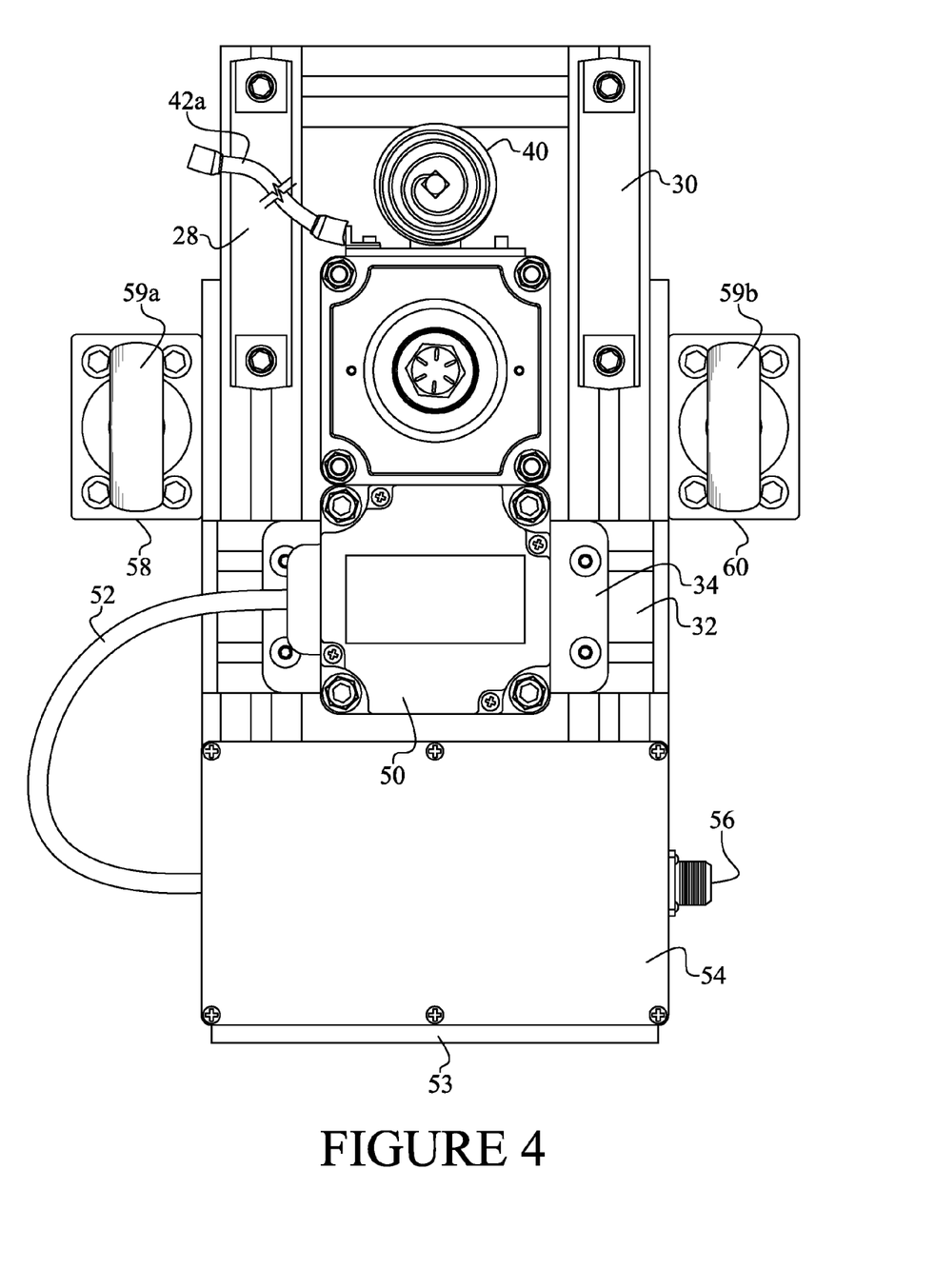
FIG. 4 depicts a double handle, single solenoid embodiment of the device including the motor.

FIG. 4 depicts a front view of another embodiment of the device having a single solenoid 40.

The single solenoid can have a single solenoid power communication cable 42a that can engage the remote switch operator.

The device can include a first magnet handle 59a and a second magnet handle 59b.

Figure 5:
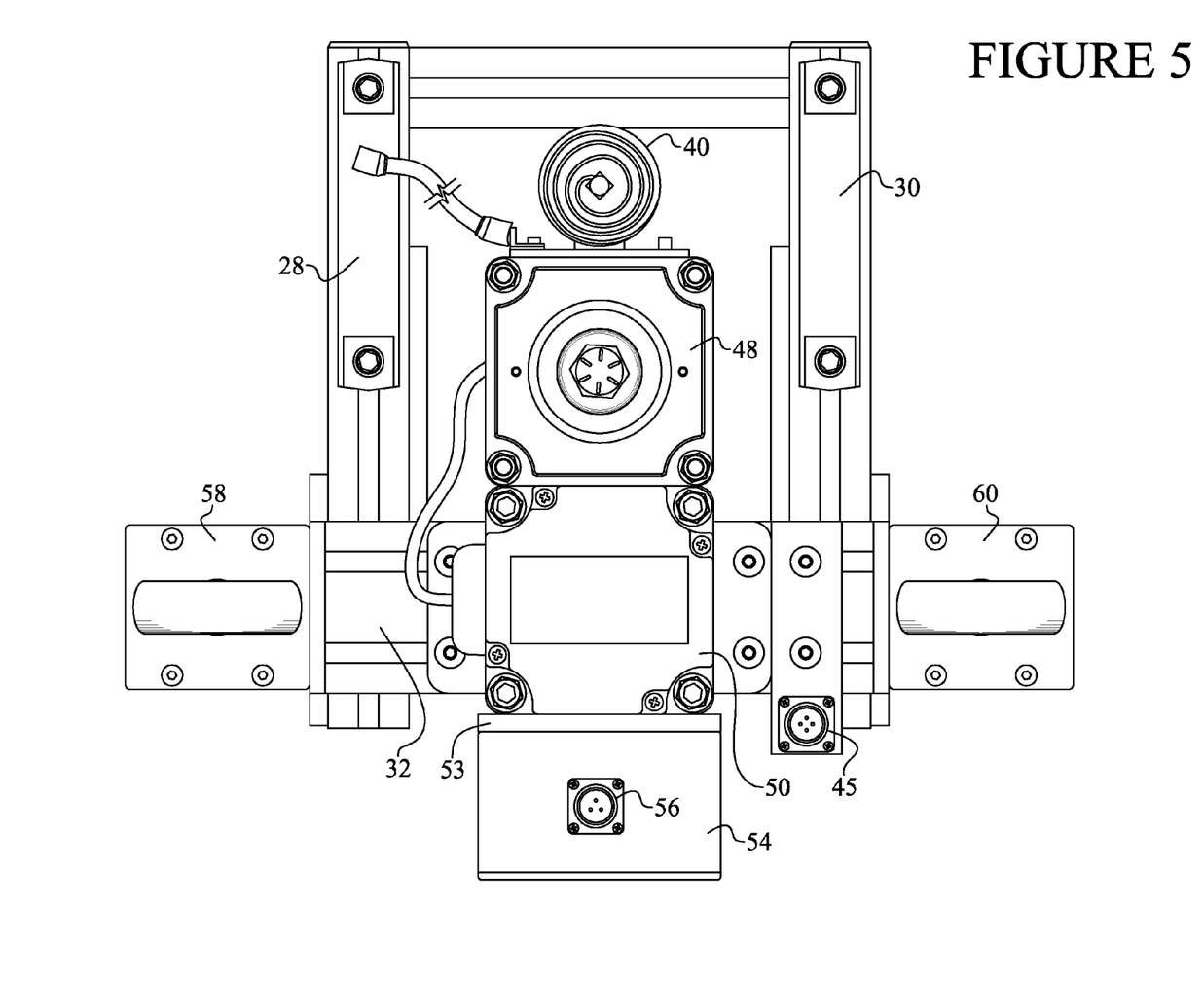
FIG. 5 depicts another double handle, single solenoid embodiment of the device including the motor.

FIG. 5 depicts a view of a double handle, single solenoid embodiment of the device.

The interface plug 56 is depicted disposed on the control box 54.

The device can include a solenoid power communication outlet 45. The power and signal cord 46 can engage the solenoid power communication outlet 45 to provide signals and power from the RSO to the solenoid through a different connection from the interface plug in the control box.

Figure 6A:
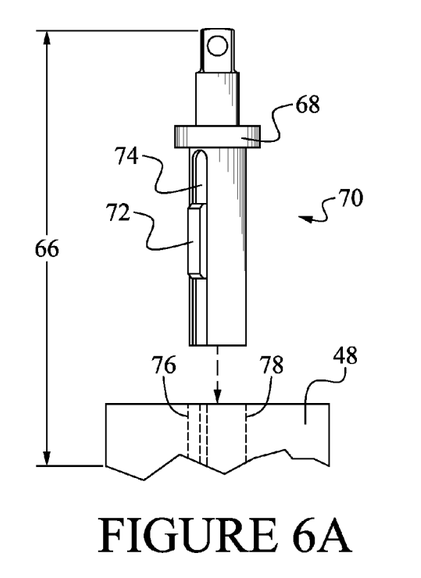
FIG. 6A depicts an embodiment of the gear assembly.

FIG. 6A depicts an embodiment of the gear assembly 66 which can be disposed in the gear box 48.

The gear assembly 66 can have a gear box collar 68 that can connect to a rotatable shaft 70.

The rotatable shaft 70 can include an engagement key 72 in a shaft key way 74.

The gear box 48 can include a gear box key way 76 for engaging the rotatable shaft 70. Also shown is the shaft housing 78 that can contain the rotatable shaft 70.

Figure 6B:
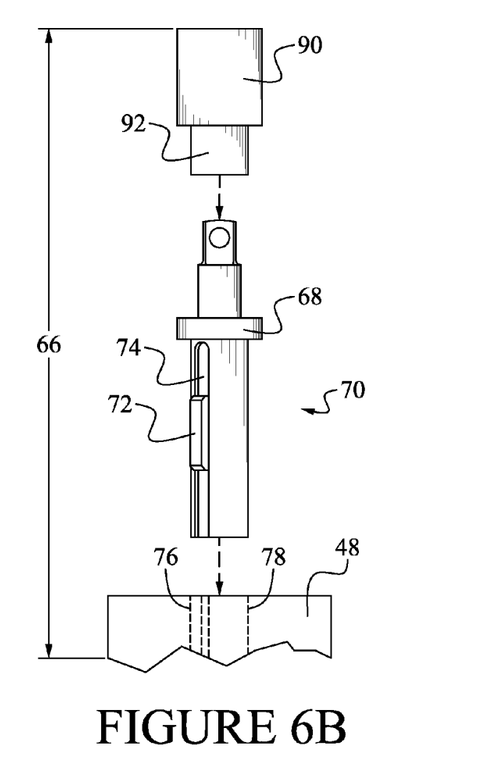
FIG. 6B is another embodiment of the gear assembly.

FIG. 6B depicts an embodiment of the gear assembly 66 which can be disposed in the gear box 48.

The gear assembly 66 can have a gear box collar 68 that can be integral with a rotatable shaft 70. A removable torque limiting clutch 90 can attached to the rotatable shaft 70.

The rotatable shaft 70 can include an engagement key 72 in a shaft key way 74 and the gear box can further have a gear box key way 76 and a shaft housing 78 for surrounding the rotatable shaft 70.

A rotating coupling 92 can engage the removable torque limiting clutch 90 opposite the rotatable shaft 70.

Figure 7:
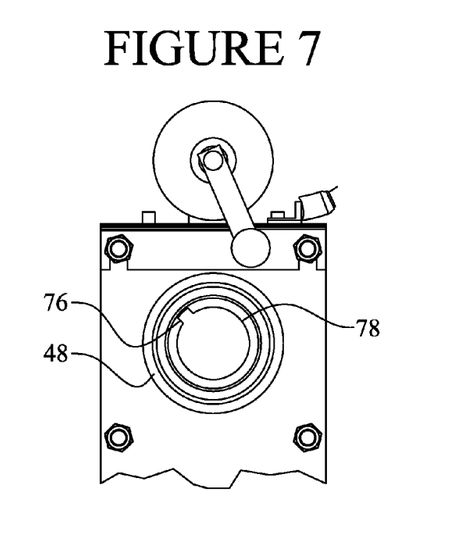
FIG. 7 depicts an embodiment of the gear box.

FIG. 7 depicts an embodiment of the gear box 48 having a gear box key way 76 and a shaft housing 78 for engaging the rotatable shaft 70.

Figure 9:
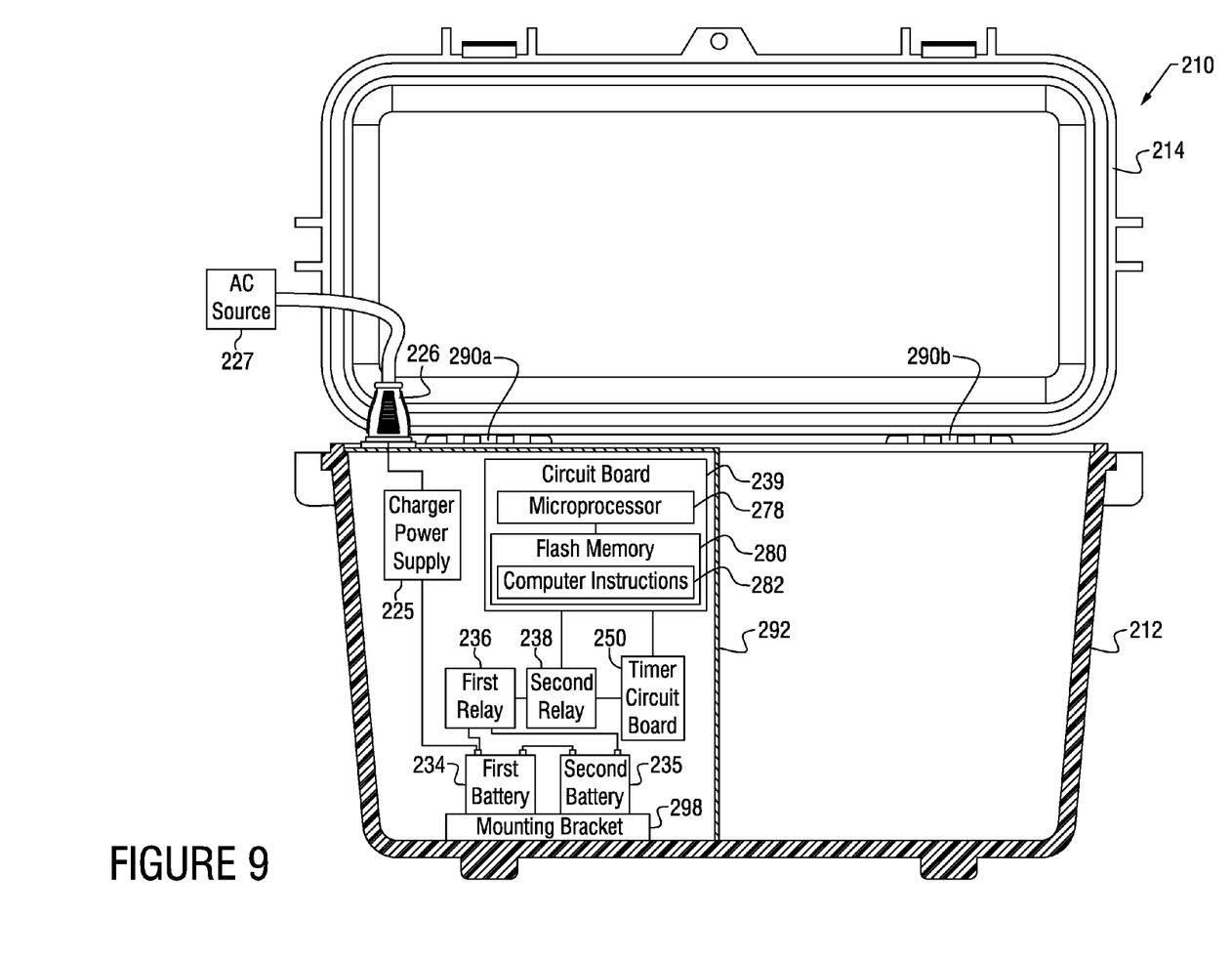
FIG. 9 is a diagram of the electronics of an embodiment of the remote switch operator.

FIGS. 8 and 9 provide details for the RSO.

FIG. 8 is a front perspective view of the RSO housing 210 with body 212 and fastenable lid 214.

Latching means 283a and 283b can connect the lid 214 to the body 212. In embodiments, only one latching means can be used.

Locking means 284a and 284b can be used to lock the lid 214 to the body 212.

The body 212 can have rigid integral support feet 213a and 213b.

Body reinforcing ribs 286a, 286b, 286c, 286d, 286e, 286f, 286g, and 286h can be disposed on a side of the body 212, and can be molded into the body.

Lid reinforcing ribs 288a, 288b, 288c, 288d, 288e, 288f, 288g, and 288h can be formed in the lid 214 as the lid is molded.

The face plate 216 can have a first plug 218 for transmitting current and signal from the housing to the charge, close, trip device.

The face plate 216 can have a second plug 220 for additionally transmitting current and signals from the housing to the charge, close, trip device.

A first cord 222 can engage the first plug 218. A second cord 224 can engage the second plug 220.

A DC charge plug 226 can be disposed in the face plate 216 for receiving DC power from a battery charger, such as an AC/DC charger or from an inverter that is remote to the housing.

A trip momentary push button 240 can be in the face plate 216 for simultaneously sending signals and power to the at least one solenoid of the charge, close, trip device from the RSO.

A close momentary push button 242 can be in the face plate 216 for simultaneously sending signals and power to the at least one solenoid of the charge, close, trip device from the RSO.

A charge/close momentary push button 244 can connect between the circuit board and the battery for sending signals and power to the motor of the charge, close, trip device.

A jog momentary push button 246 can connect between the circuit board for controlling the motors from the RSO.

An on-off switch 247 can connect and disconnect the batteries from relays.

A circuit breaker 248 can be in the face plate 216 and can interrupt the circuit between the batteries and the relays when amperage exceeds a preset limit.

A first stroke potentiometer 252 can count strokes that operate the motor of the charge, close, trip device, such as how many times to rotate the rotatable shaft.

A first timer potentiometer 254 can provide signals to the motor of the charge, close trip device, such as how long, in units of time, to turn the rotatable shaft in a first direction.

A second timer potentiometer 256 can provide signals to the motor of the charge, close, trip device, such as how long, in units of time, to turn the rotatable shaft in a second direction.

A radio transmitter receiver 257 can be connected by a cord 259 to the relays and the batteries under the face plate 216.

An automatic shut off switch 274 can be in the face plate 216 for emergency use.

A wireless remote controller 258 can communicate with the radio transmitter receiver 257.

The wireless remote controller 258 can have an on/off button 262 that can communicate to the RSO. Additionally, the wireless remote controller 258 can have a jog button 266, a trip button 268, a close button 270, and a charge/close button 272 for controlling the circuits of the push button in a wireless manner.

An emergency stop or "automatic shut off" button 274 can be on the wireless remote controller 258 as well.

Velcro™ or another attaching means can be used to secure the wireless radio controller 258 to the interior of the housing for easy transport.

FIG. 9 shows the circuit board 239 having a microprocessor 278 connected to a flash memory 280 with computer instructions 282 for comparing current sensed to predetermined limits, and when those limits are exceeded, shutting off the power coming from the RSO 210 to the charge, close, trip device.

The body 212 and lid 214 can be connected by a first hinge 290a and second hinge 290b.

The face plate can have a face plate side 292 connecting to the face plate for securing other equipment tightly into the housing and preventing water from entering the electronics under the face plate.

The RSO 210 can have a first relay 236 and a second relay 238 which can be in communication with first battery 234 and second battery 235.

The timer circuit board 250 can be between the relays and the circuit board.

The batteries can be mounted on mounting bracket 298 in the housing.

A charger power supply 225 can engage the batteries.

An AC source can be connected to the RSO 210.

Figure 10:
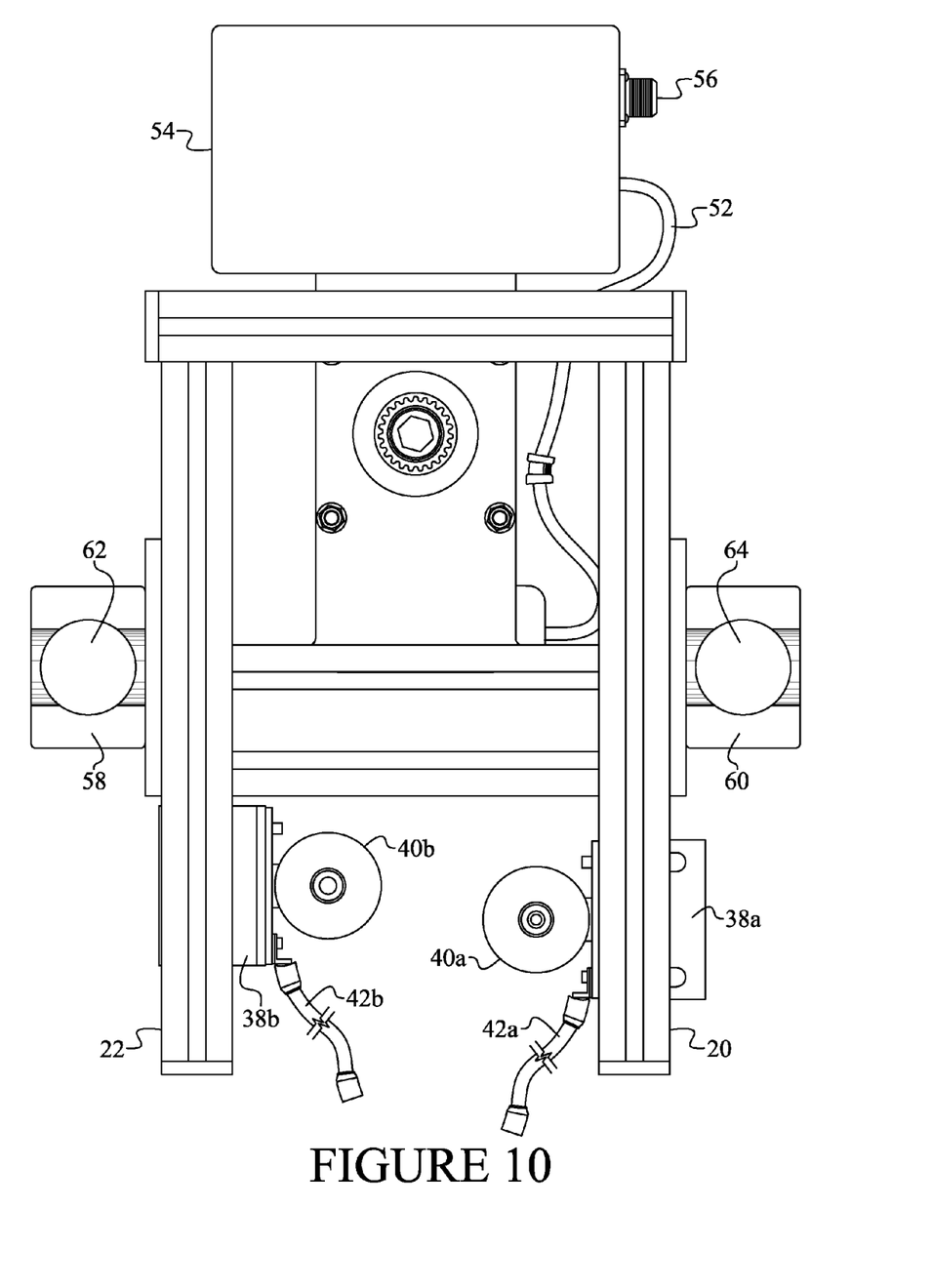
FIG. 10 presents a back view of the device of FIG. 1.

FIG. 10 shows an embodiment of the charge, close, trip device without the motor or the gear box mounted thereon.

A first extendable magnet 62 can be disposed on the at least partially shielded first magnet housing 58. A second extendable magnet 64 can be disposed on the at least partially shielded second magnet housing 60.

Figure 11:
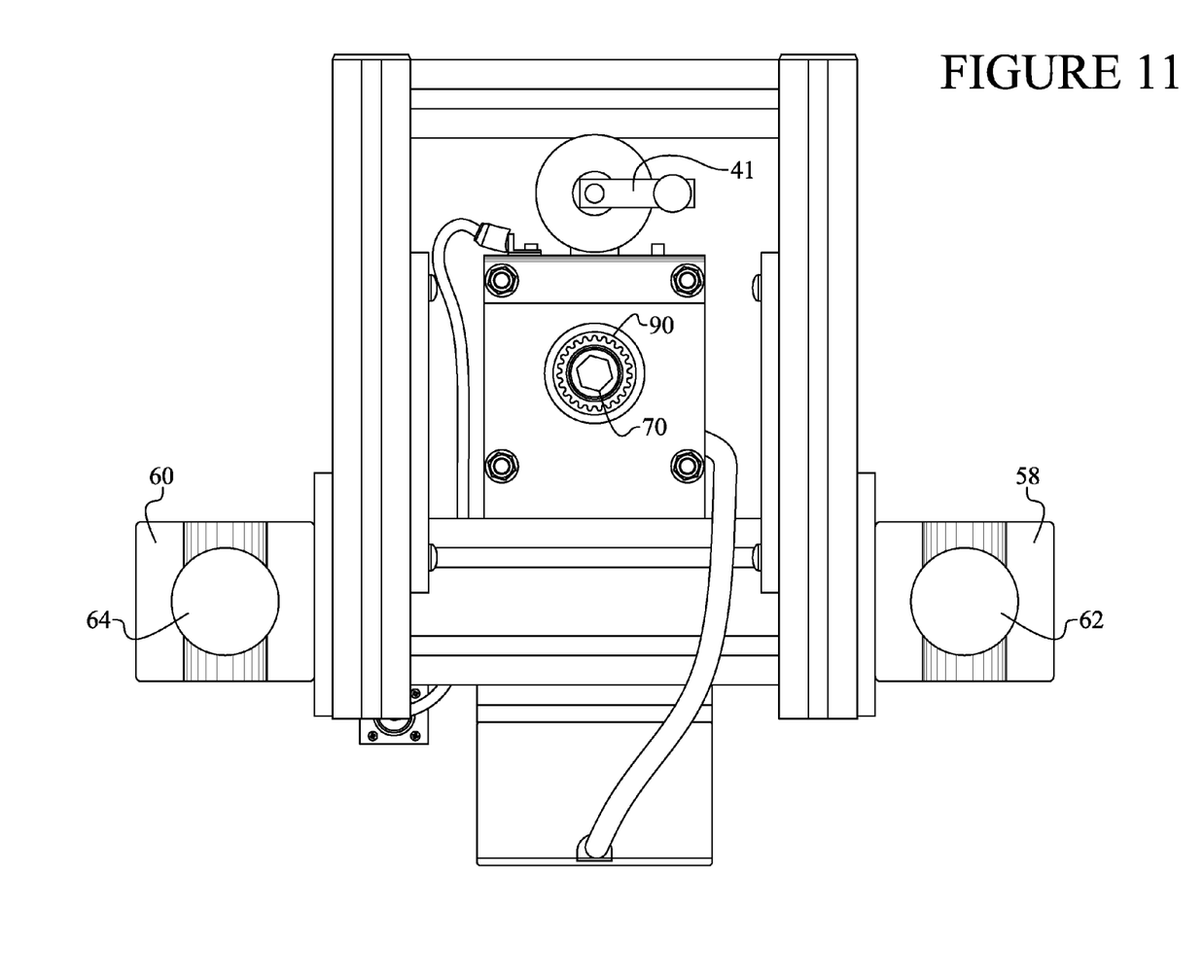
FIG. 11 is a back view of the device of FIG. 5.

FIG. 11 shows an embodiment of the device having a solenoid plunger 41 for engaging an actuating button on electrical equipment.

A removable torque limiting clutch 90 is also viewable and is secured to the rotatable shaft 70. In this embodiment the two magnets 62 and 64 can be disposed in housings 58 and 60.

Figure 12:
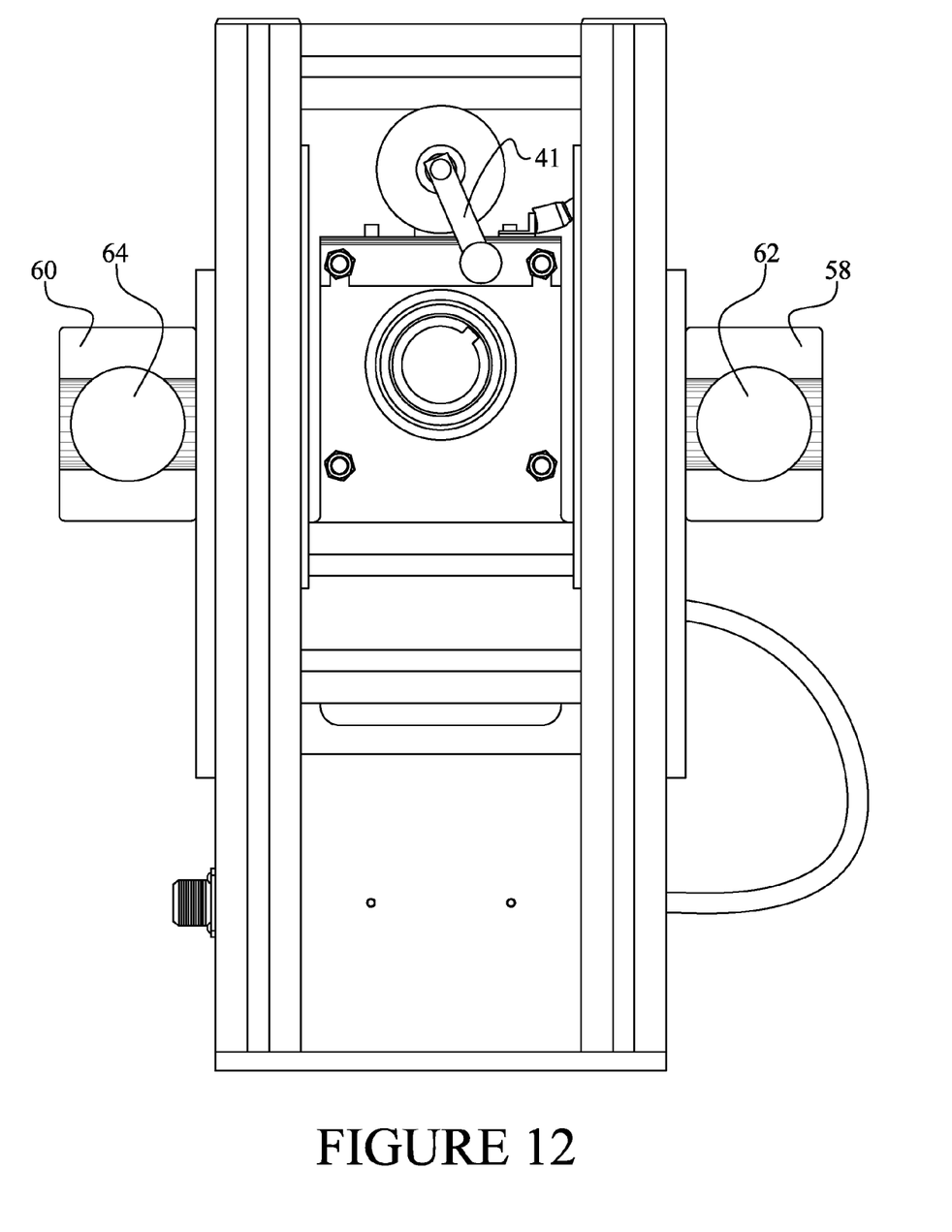
FIG. 12 is a back view of the device of FIG. 4.

FIG. 12 shows an embodiment of the device having a solenoid plunger 41, a first extendable magnet 62, an at least partially shielded first magnet housing 58, a second extendable magnet 64, and an at least partially shielded second magnet housing 60.

Figure 13:
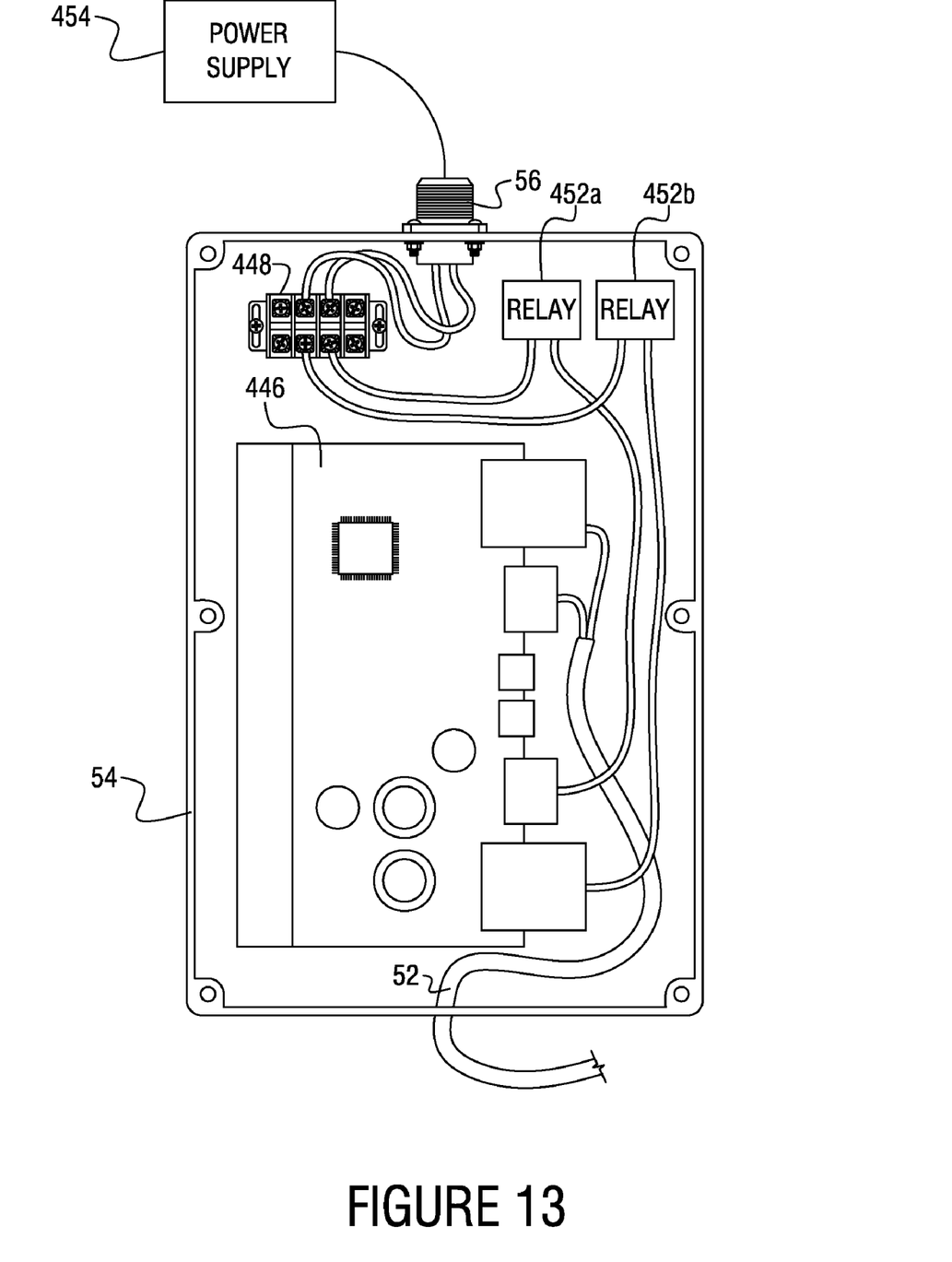
FIG. 13 is a top view of the control box.

FIG. 13 shows a top view of the control box 54 that controls the motor of the device.

In embodiments, the control box 54 can be made from aluminum or another lightweight metal alloys. The control box 54 can have a back and four sides all connected together and a removable top.

The control box 54 can receive power from a power supply 454 through the interface plug 56 on the control box.

Current can flow through the connectors 448 to relays 452a and 452b. From the relays, power can flow to the motor control circuit board 446. The motor communication cable 52 can run from the motor control circuit board to the motor.

While these embodiments have been described with emphasis on the embodiments, it should be understood that within the scope of the appended claims, the embodiments might be practiced other than as specifically described herein.

What is claimed is:

1. A charge, close, trip device with a solenoid on a frame, the device comprising:
   a. a frame comprising:
      (i) a first side support with a first side support front side; and
      (ii) a second side support with a second side support front side;
   b. a motor mount attached between the first side support and the second side support;
   c. a motor connected to the motor mount;
   d. at least one solenoid secured to the frame, motor mount, or motor, wherein each solenoid has a solenoid plunger for engaging an actuating button on electrical equipment;
   e. a means for communicating and means for providing power between each solenoid and a remote switch operator;
   f. a gear box attached to the frame;
   g. a gear assembly in the gear box, wherein the gear assembly has a gear box collar that connects to a rotatable shaft, wherein the rotatable shaft comprises an engagement key in a shaft key way, and wherein the gear box further comprises a gear box key way and a shaft housing for engaging the rotatable shaft;
   h. a motor communication means for connecting the motor with a control box, wherein the control box is mounted to the frame or to the motor mount;
   i. an interface plug disposed in the control box;
   j. at least one at least partially shielded magnet housing connected to one of the side supports; and
   k. at least one extendable magnet in the at least one at least partially shielded magnet housing secured to a magnet handle.

2. The device of claim 1, further comprising a first beam connecting the first side support with the second side support.

3. The device of claim 2, wherein the first beam is fastened onto at least one channel on the first side support front side and at least one channel on the second side support front side.

4. The device of claim 2, further comprising at least one handle connected to the frame.

5. The device of claim 4, wherein the at least one handle is connected to the first beam, the first side support, the second side support, or combinations thereof.

6. The device of claim 5, further comprising a second handle engaged with the frame opposite the first handle.

7. The device of claim 1, wherein the first side support comprises a first stabilizing foot and the second side support comprises a second stabilizing foot.

8. The device of claim 1, wherein the means for communicating and means for providing power between each solenoid and the remote switch operator engages a solenoid connector that engages the remote switch operator.

9. The device of claim 1, further comprising at least one solenoid mount bracket mounted between the at least one solenoid and the frame.

10. The device of claim 1, wherein the at least one extendable magnet is rotatable within the at least one at least partially shielded magnet housing the magnet handle.

11. The device of claim 1, further comprising a coupling disposed on the gear box collar for engaging the electrical equipment.

12. The device of claim 1, further comprising a control box mount positioned between the control box and the frame for reinforcing the frame.

13. The device of claim 1, wherein the means for communicating and means for providing power are disposed within a single solenoid power communication cable for simultaneous power and communication transmission to each solenoid.

14. The device of claim 1, wherein the remote switch operator comprises:
a. a housing with a body and a closable lid;
b. a face plate in the body;
c. a first plug in the face plate for providing current and signals from the housing to the charge, close, trip device;
d. a DC power plug in the face plate for receiving power into the housing;
e. a circuit board disposed beneath the face plate and within the housing engaging at least one relay, wherein the at least one relay engages at least one battery connected to the DC power plug for connecting to a DC power source and for charging the at least one battery;
f. a receiver/transmitter adjacent the face plate in the housing in communication with the circuit board;
g. a trip momentary push button in the face plate engaging the circuit board;
h. a close momentary push button in the face plate engaging the circuit board;
i. a charge close momentary push button in the face plate engaging the circuit board;
j. a jog momentary push button in the face plate engaging the circuit board;
k. an on/off switch in the face plate for connecting or disconnecting the at least one battery with the at least one relay;
l. a remote controller in communication with the receiver/transmitter for remotely tripping, closing, charge closing, jogging, and turning on/off components of the remote switch operator while located a distance from the remote switch operator, thereby keeping a user of the remote controller out of an arc flash hazard zone;
m. a circuit breaker in the face plate connected between the at least one relay and the on/off switch;
n. a timer circuit board in the housing beneath the face plate in communication between the at least one relay and the circuit board;
o. a first timer potentiometer in the face plate connected to the timer circuit board;
p. a second timer potentiometer in the face plate connected to the timer circuit board; and
q. a stroke potentiometer in the face plate connected to the timer circuit board, wherein the remote switch operator provides power and signals simultaneously to the charge, close, trip device using the remote controller.

15. The device of claim 14, further comprising a charger power supply in the housing beneath the face plate for receiving AC current from an outside source, and an AC plug in the face plate for receiving AC current from the outside source and transferring the AC current to the charger power supply.

16. The device of claim 14, further comprising an automatic shut off switch on the face plate connected to the circuit board for disabling the charge, close, trip device when the charge, close, trip device exceeds a preset amperage.

17. The device of claim 16, wherein the remote controller comprises a member of the group consisting of: an on/off button, a jog button, a trip button, a close button, a charge/close button, an automatic shut off button, and combinations thereof, for remotely actuating the remote switch operator.

18. The device of claim 16, wherein the remote switch operator further comprises a microprocessor in communication with a flash memory with computer instructions for comparing signals from each potentiometer to a predetermined threshold.

19. The device of claim 14, wherein the electrical equipment is a low voltage circuit breaker using up to 1000 volts, a medium voltage circuit breaker using from 1000 volts to 20000 volts, a switch gear, or a manually operated circuit breaker.

20. A charge, close, trip device with a solenoid on a frame for attaching to a power supply, the device comprising:
a. a frame comprising:
(i) a first side support with a first side support front side; and
(ii) a second side support with a with a second side support front side;
b. a motor mount attached between the first side support and the second side support;
c. a motor connected to the motor mount;
d. at least one solenoid secured to the frame, motor mount, or motor, wherein each solenoid has a solenoid plunger for engaging an actuating button on electrical equipment;
e. a means for communicating and means for providing power between each solenoid and a remote switch operator;
f. a gear box attached to the frame;
g. a gear assembly in the gear box with a collar integral with a rotatable shaft;
h. a removable torque limiting clutch engaged with the rotatable shaft, wherein the rotatable shaft comprises an engagement key in a shaft key way, and wherein the gear box further comprises a gear box key way and a shaft housing for surrounding the rotatable shaft;
i. a rotating coupling attached to the removable torque limiting clutch opposite the rotatable shaft;
j. a motor communication means for connecting the motor with a control box, wherein the control box is mounted to the frame or to the motor mount;
k. an interface plug disposed in the control box;
l. at least one at least partially shielded magnet housing connected to one of the side supports; and
m. at least one extendable magnet in the at least one at least partially shielded magnet housing secured to a magnet handle.

* * * * *